(12) United States Patent
Lapp

(10) Patent No.: US 10,321,627 B1
(45) Date of Patent: Jun. 18, 2019

(54) ADJUSTABLE MACHINE HANDLE ASSEMBLY

(71) Applicant: Schiller Grounds Care, Inc., Southampton, PA (US)

(72) Inventor: Jonathan Lapp, Johnson Creek, WI (US)

(73) Assignee: SCHILLER GROUNDS CARE, INC., Southampton, PA (US)

( * ) Notice: Subject to any disclaimer, the term of this patent is extended or adjusted under 35 U.S.C. 154(b) by 0 days.

(21) Appl. No.: 15/841,732

(22) Filed: Dec. 14, 2017

(51) Int. Cl.
*G05G 1/04* (2006.01)
*A01D 34/82* (2006.01)
*B62D 1/12* (2006.01)

(52) U.S. Cl.
CPC ............ *A01D 34/824* (2013.01); *B62D 1/12* (2013.01); *G05G 1/04* (2013.01); *G05G 2700/02* (2013.01)

(58) Field of Classification Search
CPC .... G05G 1/04; G05G 2700/02; A01D 34/824; B62D 1/12; F16B 7/04; F16B 7/10; F16B 7/042; B62K 21/16; B62K 21/125; B62K 21/12
See application file for complete search history.

(56) References Cited

U.S. PATENT DOCUMENTS

| | | | | |
|---|---|---|---|---|
| 1,301,475 A * | 4/1919 | Mellin | ................... | B60K 20/02 403/104 |
| 6,206,395 B1 * | 3/2001 | Young | .................... | B62K 21/16 280/278 |
| 6,951,092 B2 | 10/2005 | Busboom et al. | | |
| 7,634,953 B2 | 12/2009 | Hoffman et al. | | |
| 8,087,481 B2 | 1/2012 | Trefz et al. | | |
| 8,936,262 B2 | 1/2015 | Nabeta | | |
| 8,984,718 B2 | 3/2015 | Ejdehag et al. | | |
| 2006/0230872 A1 * | 10/2006 | Huang | ................. | B62K 21/125 74/551.1 |
| 2007/0231059 A1 * | 10/2007 | Mullaney | ............. | A61B 17/645 403/52 |
| 2008/0256919 A1 | 10/2008 | Schreiner | | |

(Continued)

FOREIGN PATENT DOCUMENTS

| | | | | |
|---|---|---|---|---|
| FR | 1191504 A | * | 10/1959 | ............... A61F 5/04 |
| FR | 2736032 A1 | * | 1/1997 | ............. B62K 21/16 |

OTHER PUBLICATIONS

Machine Translation of FR 1,191,504, obtained Jan. 17, 2018.*
Machine Translation of FR 2,736,032, obtained Jan. 17, 2018.*

*Primary Examiner* — Richard W Ridley
*Assistant Examiner* — Brian J McGovern
(74) *Attorney, Agent, or Firm* — Panitch Schwarze Belisario & Nadel LLP

(57) ABSTRACT

A multi-axis adjustable machine handle may comprise a handle assembly and a handle mounting assembly. The handle mounting assembly may comprise a clamping assembly including an elongate clamp with first and second sides rotatably engaging the handle assembly and first and second cup-shaped members slidably engaging the elongate clamp. The handle mounting assembly may further comprise a locking assembly extending through the first cup-shaped member, second cup-shaped member, and elongate clamp to selectively prevent relative movement. Finally, the handle mounting assembly may also comprise a support brace engaging the second cup-shaped member.

14 Claims, 6 Drawing Sheets

(56) References Cited

U.S. PATENT DOCUMENTS

| | | |
|---|---|---|
| 2009/0057505 A1* | 3/2009 | Chen .................... B62K 15/006 |
| | | 248/185.1 |
| 2009/0078076 A1* | 3/2009 | Chen ..................... B62K 21/16 |
| | | 74/551.8 |
| 2012/0085205 A1 | 4/2012 | Quick |
| 2014/0112702 A1 | 4/2014 | Mighells |
| 2016/0037719 A1 | 2/2016 | Bian et al. |

* cited by examiner

ADJUSTABLE MACHINE HANDLE ASSEMBLY

BACKGROUND

In order to cut large swathes of grass in a short period of time, riding lawn mowers have risen in popularity and use in recent years. Riding lawn mowers, and more recently zero-turn (herein "ZT") mowers have given users the ability to rapidly cut grass with uniformity and precision. On a ZT mower, the user is traditionally seated above the cutting blades and in front of the mower's engine. Typically, a pair of handles extends from the mower's frame which the user operates in conjunction to control the movement and turning of the ZT mower.

The amount of continuous time that a ZT mower may be used is determined in part by the comfort of the handles. In traditional ZT mower handles, the handles are provided without adjustability for user customization. In other ZT mower handles, some handles are provided with the ability to adjust in two degrees of freedom. However, a tool kit is required to loosen the appropriate hardware to allow the handle to adjust. Such adjustments are not capable of being done quickly in the field while the mower is being used. Aspects of the present disclosure are directed to a multi-axis adjustable machine handle for a ZT mower which is adjustable in three degrees of freedom without the need for tools to facilitate the adjustment.

BRIEF SUMMARY OF THE DISCLOSURE

An adjustable machine handle assembly, comprising a handle assembly; and a handle mounting assembly configured to receive the handle assembly and to permit positional adjustment of the handle assembly in three degrees of freedom, wherein the handle mounting assembly is configured to selectively permit and to selectively prevent adjustment of the handle assembly position according to all three degrees of freedom by using a human hand, without the use of a tool.

BRIEF DESCRIPTION OF THE SEVERAL VIEWS OF THE DRAWINGS

The foregoing summary, as well as the following detailed description, will be better understood when read in conjunction with the appended drawings. For purposes of illustration, there are shown in the drawings various aspects of the present disclosure. It should be understood, however, that the invention is not limited to the precise arrangements and instrumentalities shown.

In the drawings.

DETAILED DESCRIPTION

Figure 1:
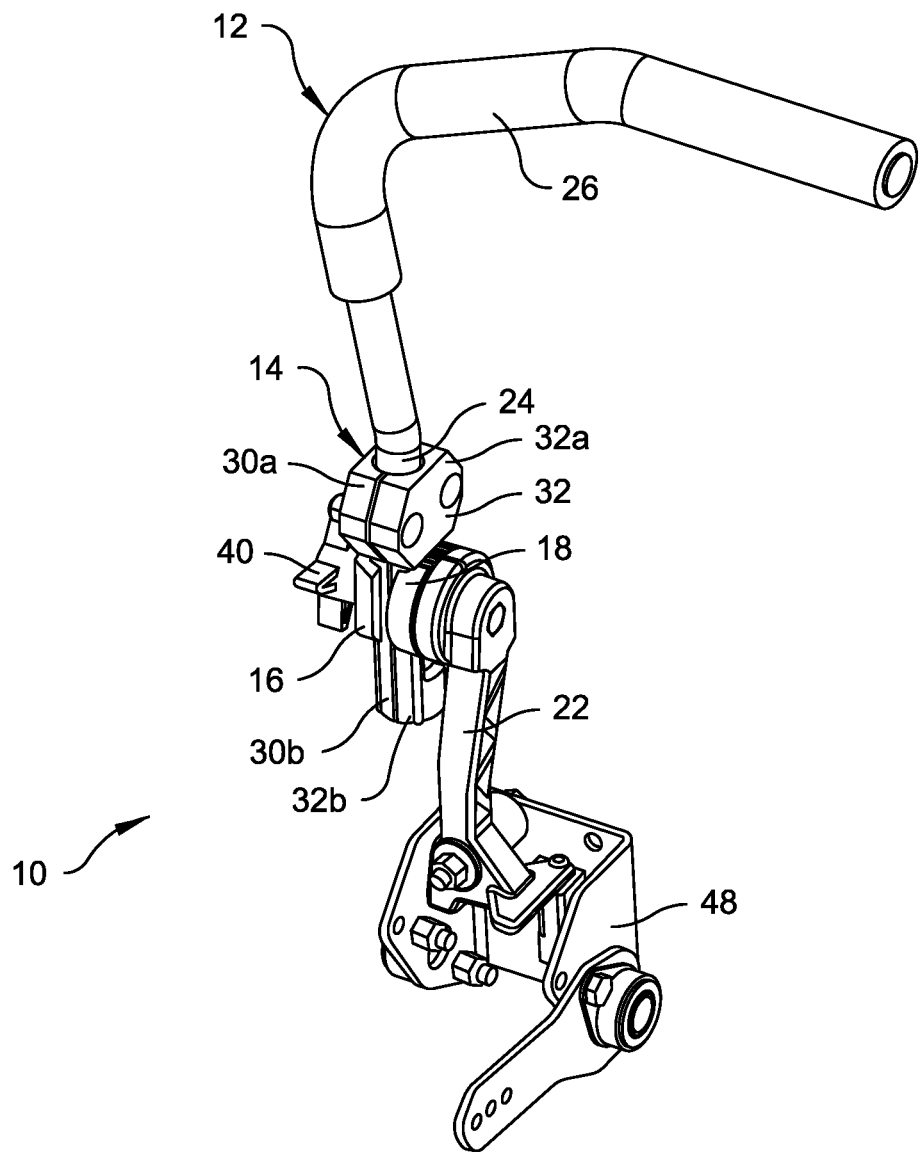
FIG. 1 is a front and top perspective view of the adjustable machine handle assembly according to various aspects of this disclosure.

Reference will now be made in detail to aspects of the present disclosure, examples of which are illustrated in the accompanying drawings. The terminology used in the description herein is for the purpose of describing the various aspects of this disclosure only and is not intended to limit the invention.

As used in this disclosure, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of the stated features, integers, operations, elements, and/or components, but do not preclude the presence of addition of one or more other features, integers, steps, operations, elements, components, and/or groups thereof.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The words "right," left," "lower," "upper," "front" and "rear" designate directions in the drawings to which reference is made. The words "inwardly" and "outwardly" refer to directions toward and away from, respectively, the geometric center of the handle assembly, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first side could be termed a second side, and vice versa.

Figure 2:
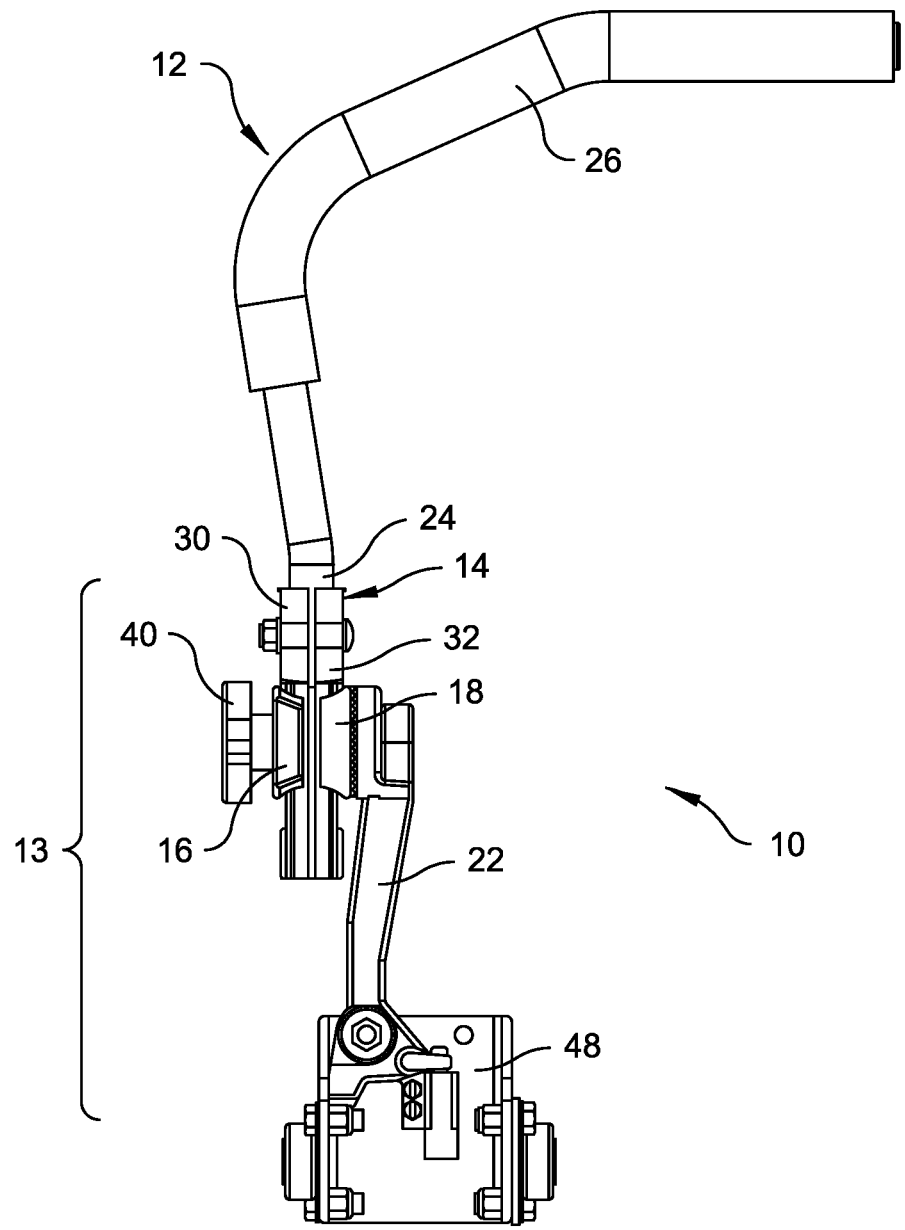
FIG. 2 is a front elevational view of the adjustable machine handle assembly of FIG. 1.
Figure 3:
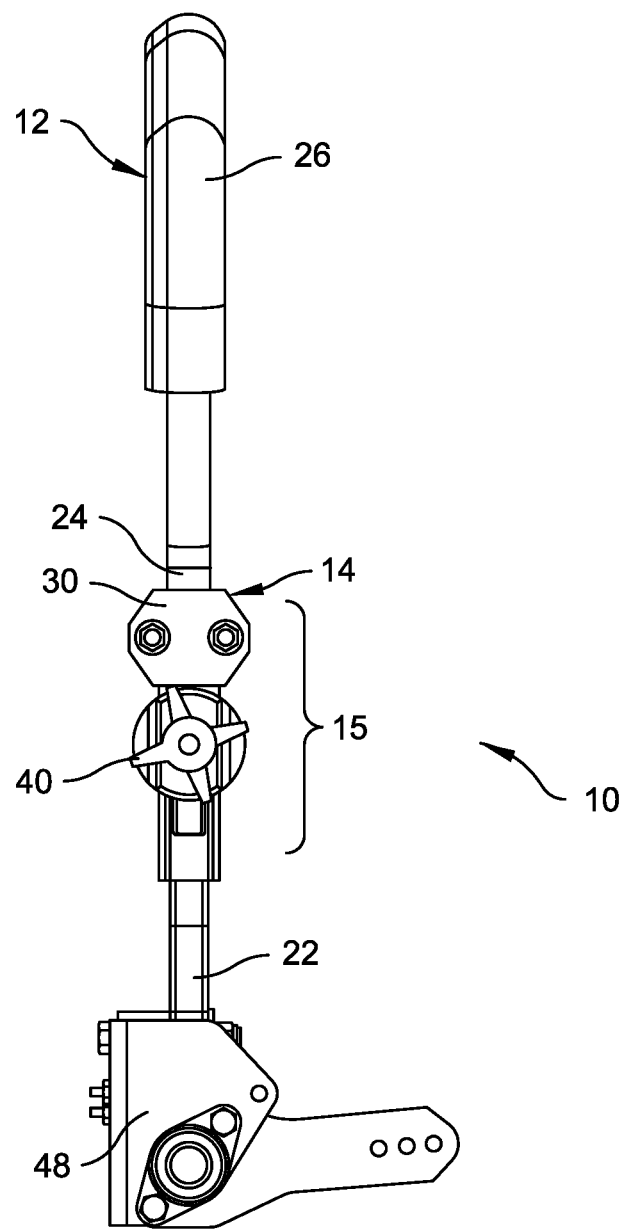
FIG. 3 is a right side elevational view of the adjustable machine handle assembly of FIG. 1.
Figure 4:
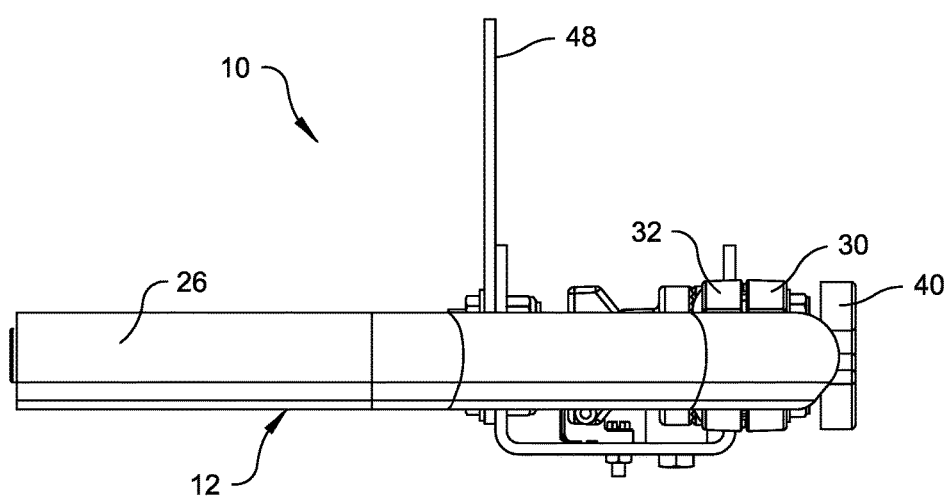
FIG. 4 is a top plan view of the adjustable machine handle assembly of FIG. 1.
Figure 5:
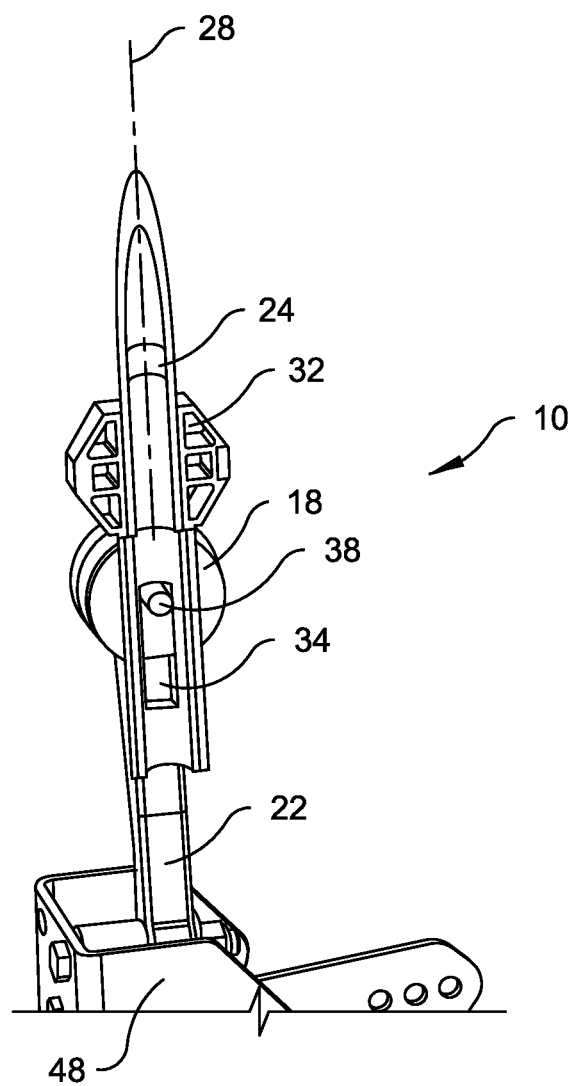
FIG. 5 is a sectional right side elevational view of the adjustable machine handle assembly of FIG. 1.
Figure 6:
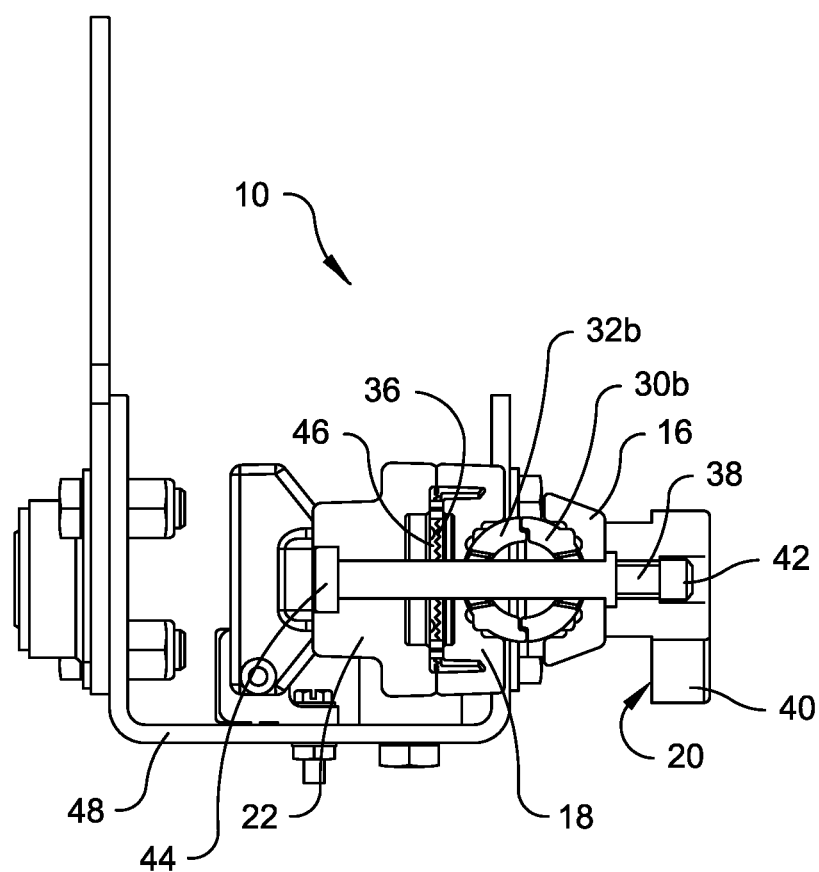
FIG. 6 is a sectional top plan view of the adjustable machine handle assembly of FIG. 1.

Referring to the drawings in detail, where like numerals indicate like elements throughout, in FIGS. 1-6, an adjustable machine handle assembly according to various aspects of the present disclosure, designated 10, is shown. The handle 10 may comprise a handle assembly 12 and a handle mounting assembly 13. The handle mounting assembly 13 may comprise a clamping assembly 15, a locking assembly 20, and a support brace 20. The clamping assembly 15 may comprise an elongate clamp 14, a first cup-shaped member 16, and a second cup-shaped member 18. The handle assembly 12 may include a handle pole 24 and a handle-bar 26 that may be fixedly attached to and may extend upward from the handle 24. According to one aspect, the handle-bar 26 may include one or more bends in order to improve the ergonomics of the multi-axis adjustable machine handle 10. Additionally, according to another aspect, the handle-bar 26 may be covered with a rubber, polymeric, elastomeric, or any other suitable material that is well known in the art for ergonomic comfort of the ZT mower user. The handle pole 24 defines a longitudinal axis 28 along its length (see FIG. 5). The handle assembly 12 may be constructed of a metallic material, but could be made from any suitable material well-known in the art.

The elongate clamp 14 of the clamping assembly 15 may include a first side 30 and a second side 32, which may be releasably engaged with the first side 30. Each of the first and second sides 30, 32 may include a head section 30a, 32a and a neck section 30b, 32b extending from the head section 30a, 32a. The neck sections 30b, 32b may have an outer dimension that is smaller than an outer dimension of the head sections 30a, 32a. The first side 30 and the second side 32 may be configured to receive at least a portion of the handle assembly 12. The first and second sides 30, 32 of the elongate clamp 14 may receive the handle pole 24 of the handle assembly 12 in rotatable engagement. The elongate clamp 14 may further include a slot 34 extending through the first side 30 and the second side 32 (see FIG. 5). The slot 34 may extend through the neck portions 30b, 32b of the first and second sides 30, 32. The elongate clamp 14 may be constructed of a metallic material, but may also be constructed of any suitable material that is well known in the art.

The handle 10 may further include a first cup-shaped member 16 and a second cup-shaped member 18. The first and second cup-shaped members 16, 18 may be configured to slidably receive at least a portion of the elongate clamp 14 therebetween. Specifically, the first cup-shaped member 16 may be configured to engage the first side 30 of the elongate clamp 14, and the second cup-shaped member 18 may be configured to engage the second side 32 of the elongate clamp 14. The first and second cup-shaped members 16, 18 may be configured such that a user can selectively translate the elongate clamp 14 relative to the first and second cup-shaped members 16, 18 in a direction parallel to the longitudinal axis 28 of the handle pole 24 of the handle assembly 12. The second cup-shaped member 18 may include a plurality of serrated teeth 36 disposed in a direction opposite a direction facing the first cup-shaped member 16. The first and second cup-shaped members 16, 18 may be constructed of a metallic material, but may also be constructed of any suitable material well known in the art.

The handle 10 may further include a locking assembly 20. The locking assembly 20 may extend through the first cup-shaped member 16, the slot 34 of the elongate clamp 14, and the second cup shaped member 18 (see FIG. 6). The locking assembly 20 may include a shaft 38 and a fastener 40 disposed on the shaft 38. The shaft 38 may be a threaded shaft 38. According to an aspect of this disclosure, the fastener 40 may be a hand nut; but it may alternatively be any other suitable fastener well known in the art, for example, a latch, a screw, or a nail. The locking assembly 20 may have a first end 42 disposed proximate the first cup-shaped member 16 and a second end 44 disposed proximate the second cup-shaped member 18. The locking assembly 20 may be constructed of a metallic material, but may also be constructed of any other suitable material well known in the art.

The handle 10 may further include a support brace 22 attached to the second end 44 of the locking assembly 20 proximate the second cup-shaped member 18. The support brace 22 may include a plurality of teeth 46 configured to engage the plurality of serrated teeth 36 of the second cup-shaped member 18. When the plurality of serrated teeth 36 and the plurality of teeth 46 are engaged, relative translational movement between the second cup-shaped member 18 and the support brace 22 in a direction orthogonal to the longitudinal axis 28 is prevented. Optionally, the support brace 22 may be secured to a mounting bracket 48 for attachment to a ZT mower. The support brace 22 may be constructed of a metallic material, but may be constructed of any other suitable material well known in the art.

In operation, the handle pole 24 of the handle assembly 12 may be slidably inserted between the first and second sides 30, 32, of the elongate clamp 14. The handle assembly 12 and the elongate clamp 14 together may be slidably inserted between the first and second cup-shaped members 16, 18.

The shaft 38 of the locking assembly 20 may be inserted through the first cup-shaped member 16, the slot 34 of the elongate clamp 14, and the second cup-shaped member 18. The fastener 40 may be disposed on the first end 42 of the shaft 38. The support brace 22 may be engaged with the second end 44 of the shaft 38. When the fastener 42 is tightened, the locking assembly 20 may then secure the pieces of the handle 10 together, and relative movement of the pieces may be substantially prevented. When the fastener 40 is loosened, which may be performed by hand, without the need for tools, the handle 10 is capable of being adjusted in three degrees of freedom. Namely, the handle assembly 12 can be rotated about the longitudinal axis 24, the elongate clamp 14 can be translated along the longitudinal axis 24, and the handle and clamping assemblies 12, 15 can be translated together in a direction orthogonal to the longitudinal axis 28. When the fastener 40 is re-tightened, which, again, may be done by hand, without the need for tools, the relative movement of the pieces may be substantially arrested and prevented.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

I claim:

1. An adjustable machine handle assembly, comprising:
   a handle assembly;
   a handle mounting assembly configured to receive the handle assembly and to permit positional adjustment of the handle assembly in three degrees of freedom, comprising: a first cup-shaped member, a second cup-shaped member, and an elongate clamp disposed between the first and second cup-shaped members;
   wherein the elongate clamp includes a first side and a second side;
   wherein the first side of the elongate clamp includes a first slot and the second side of the elongate clamp includes a second slot;
   a support brace; and
   a shaft that extends through the first cup-shaped member, the first slot, the second slot, the second cup-shaped member and into the support brace, whereby the shaft is configured to selectively permit and selectively prevent adjustment of handle assembly position in all three degrees of freedom.

2. The adjustable machine handle assembly of claim 1, wherein the handle assembly comprises a handle pole and a handlebar, the handle pole defining a longitudinal axis.

3. The adjustable machine handle assembly of claim 1, wherein the elongate clamp is configured to rotatably receive at least a portion of the handle assembly between the first and second sides.

4. The adjustable machine handle assembly of claim 1, wherein the first and second cup-shaped members are configured to slidably receive at least a portion of the elongate clamp therebetween, the first cup-shaped member configured to engage the first side of the elongate clamp and the second cup-shaped member configured to engage the second side of the elongate clamp.

5. The adjustable machine handle assembly of claim 4, wherein the second cup-shaped member includes a plurality of serrated teeth disposed in a direction opposite a direction facing the first cup-shaped member.

6. The adjustable machine handle assembly of claim 4, comprising: a fastener coupled to the shaft and having a structure that facilitates tightening and loosening of the shaft by a human hand, without the use of a tool; the shaft having a first end proximate the first cup-shaped member and a second end proximate the second cup-shaped member.

7. The adjustable machine handle assembly of claim 6, wherein the fastener is a hand nut.

8. The adjustable machine handle assembly of claim 6, wherein the support brace includes a plurality of teeth configured to engage a plurality of serrated teeth of the second cup-shaped member, the serrated teeth being disposed in a direction opposite a direction facing the first cup-shaped member.

9. The adjustable machine handle assembly of claim 8, wherein the handle assembly comprises a handle pole and a handlebar, the handle pole defining a longitudinal axis, and wherein the handle and clamping assemblies are configured to translate orthogonal to the longitudinal axis relative to the support brace when the shaft is loosened.

10. The adjustable machine handle assembly of claim 8, wherein the adjustable machine handle assembly comprises:
a mounting bracket secured to the support brace at an end opposite the second cup-shaped member.

11. The adjustable machine handle assembly of claim 6, wherein the handle assembly comprises a handle pole and a handlebar, the handle pole defining a longitudinal axis, and wherein the handle assembly is configured to rotate about the longitudinal axis relative to the clamping assembly when the shaft is loosened.

12. The adjustable machine handle assembly of claim 6, wherein the handle assembly comprises a handle pole and a handlebar, the handle pole defining a longitudinal axis, and wherein the elongate clamp is configured to translate along the longitudinal axis relative to the first and second cup-shaped members when the shaft is loosened.

13. The adjustable machine handle assembly of claim 6, wherein the handle mounting assembly is configured to prevent positional adjustability of the handle assembly when the shaft is tightened.

14. The adjustable machine handle assembly of claim 6, wherein the handle mounting assembly is configured to permit positional adjustability of the handle assembly when the shaft is loosened.

* * * * *